(12) United States Patent (10) Patent No.: US 11,758,115 B2
Alvarez Diez et al. (45) Date of Patent: Sep. 12, 2023

(54) METHOD FOR THE USER-SPECIFIC CALIBRATION OF A DISPLAY APPARATUS, WEARABLE ON THE HEAD OF A USER, FOR AN AUGMENTED PRESENTATION

(71) Applicant: tooz technologies GmbH, Aalen (DE)

(72) Inventors: Cristina Alvarez Diez, Aalen (DE); Momchil Davidkov, Aalen (DE); Holger Wegendt, Moegglingen (DE)

(73) Assignee: tooz technologies GmbH, Aalen (DE)

( * ) Notice: Subject to any disclaimer, the term of this patent is extended or adjusted under 35 U.S.C. 154(b) by 187 days.

(21) Appl. No.: 16/980,759

(22) PCT Filed: Mar. 13, 2019

(86) PCT No.: PCT/EP2019/056325
§ 371 (c)(1),
(2) Date: Sep. 14, 2020

(87) PCT Pub. No.: WO2019/175269
PCT Pub. Date: Sep. 19, 2019

(65) Prior Publication Data
US 2021/0289192 A1 Sep. 16, 2021

(30) Foreign Application Priority Data
Mar. 14, 2018 (DE) .......................... 102018105917.5

(51) Int. Cl.
*G09G 5/00* (2006.01)
*H04N 13/327* (2018.01)
(Continued)

(52) U.S. Cl.
CPC ....... *H04N 13/327* (2018.05); *G02B 27/0093* (2013.01); *G02B 27/0172* (2013.01);
(Continued)

(58) Field of Classification Search
CPC ............... H04N 13/327; H04N 13/344; G02B 27/0093; G02B 27/0172
(Continued)

(56) References Cited

U.S. PATENT DOCUMENTS 5,617,155 A 4/1997 Ducarouge et al.
7,651,220 B1 1/2010 Pattikonda
(Continued)

FOREIGN PATENT DOCUMENTS

CN 107065198 A1 8/2017
DE 102011122206 A1 6/2013
(Continued)

*Primary Examiner* — Jonathan M Blancha
(74) *Attorney, Agent, or Firm* — Skaar Ulbrich Macari, P.A.

(57) ABSTRACT

A method is provided for the user-specific calibration of a display apparatus, wearable on the head of a user, for an augmented presentation, wherein A), in a basic calibration step, the position of the at least one eye is ascertained relative to the display apparatus in all three spatial directions in the state where the display apparatus is worn on the head of the user and said position is saved in the display apparatus as adjustment data in such a way that an image generating module of the display apparatus generates the image taking account of the adjustment data.

19 Claims, 4 Drawing Sheets

(51) Int. Cl.
  *H04N 13/344* (2018.01)
  *G02B 27/00* (2006.01)
  *G02B 27/01* (2006.01)
  *G06F 3/01* (2006.01)

(52) U.S. Cl.
  CPC .......... *G06F 3/013* (2013.01); *H04N 13/344* (2018.05); *G02B 2027/011* (2013.01); *G02B 2027/0129* (2013.01); *G02B 2027/0138* (2013.01); *G02B 2027/0178* (2013.01); *H04N 2213/008* (2013.01)

(58) Field of Classification Search
  USPC .......................................................... 345/8
  See application file for complete search history.

(56) References Cited

U.S. PATENT DOCUMENTS

| | | | |
|---|---|---|---|
| 8,356,896 B2 | 1/2013 | Esser et al. | |
| 8,397,181 B2 | 3/2013 | Hartman et al. | |
| 8,860,634 B2 | 10/2014 | Benson et al. | |
| 9,025,252 B2 | 5/2015 | Lewis et al. | |
| 9,213,163 B2 | 12/2015 | Lewis et al. | |
| 2007/0285346 A1 | 12/2007 | Li | |
| 2010/0128220 A1 | 5/2010 | Chauveau | |
| 2013/0120224 A1 | 5/2013 | Cajigas et al. | |
| 2013/0235169 A1 | 9/2013 | Kato et al. | |
| 2014/0055747 A1* | 2/2014 | Nistico | A61B 3/14 351/246 |
| 2015/0288944 A1 | 10/2015 | Nistico et al. | |
| 2016/0080732 A1 | 3/2016 | Pedley et al. | |
| 2016/0084647 A1 | 3/2016 | Lee et al. | |
| 2016/0116741 A1* | 4/2016 | Sato | G02B 27/017 345/8 |
| 2016/0187662 A1 | 6/2016 | Sato | |
| 2016/0299360 A1 | 10/2016 | Fonte et al. | |
| 2017/0122725 A1 | 5/2017 | Yeoh et al. | |
| 2017/0161956 A1* | 6/2017 | Fu | G06F 1/1686 |
| 2017/0293146 A1* | 10/2017 | Nicholls | G02B 27/0093 |
| 2018/0018515 A1 | 1/2018 | Spizhevoy et al. | |
| 2018/0196509 A1* | 7/2018 | Trail | G02B 27/0172 |
| 2019/0271858 A1 | 9/2019 | Nieuwenhuis et al. | |
| 2019/0346698 A1 | 11/2019 | Nieuwenhuis et al. | |
| 2020/0073151 A1 | 3/2020 | Alvarez Diez et al. | |

FOREIGN PATENT DOCUMENTS

| | | |
|---|---|---|
| DE | 202016104179 U1 | 9/2016 |
| EP | 3252566 A1 | 12/2017 |

* cited by examiner

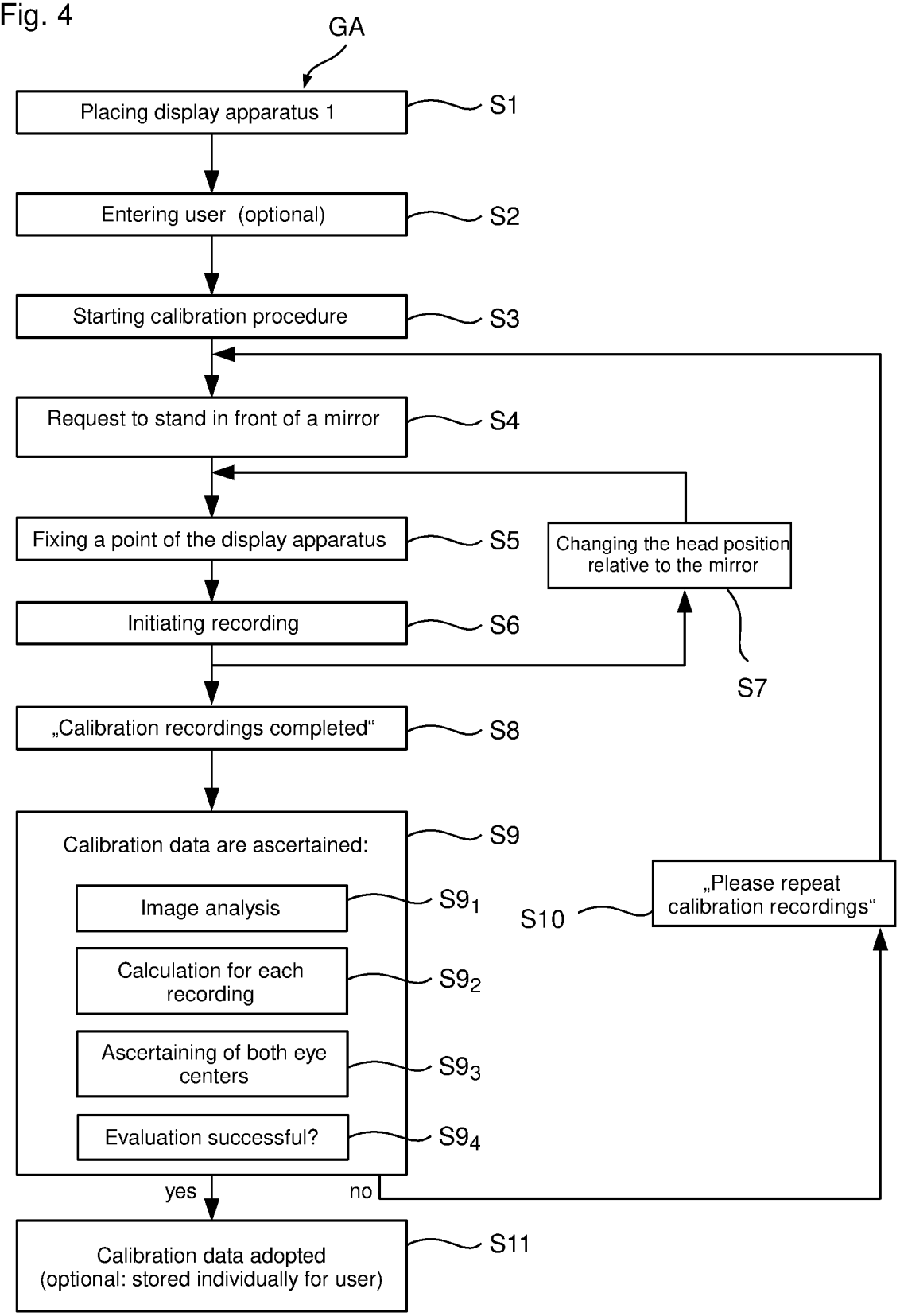

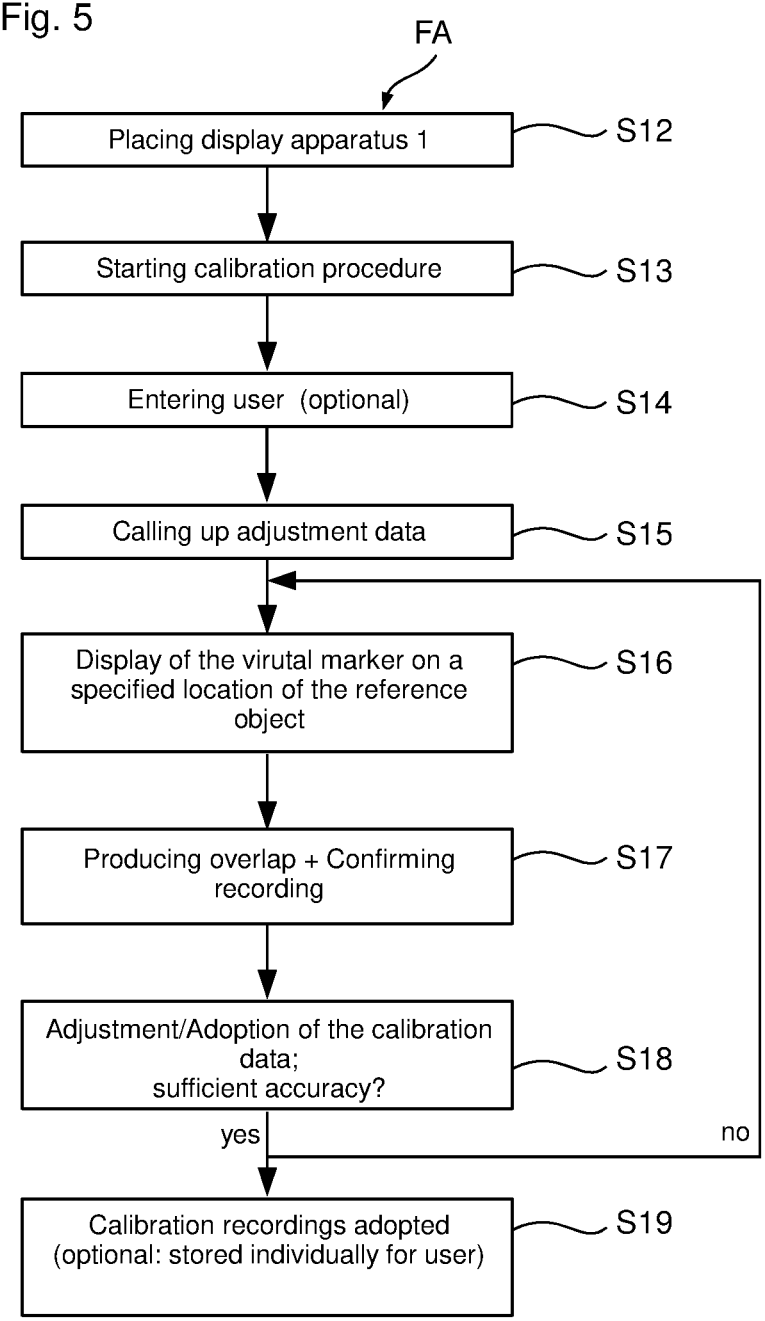

METHOD FOR THE USER-SPECIFIC CALIBRATION OF A DISPLAY APPARATUS, WEARABLE ON THE HEAD OF A USER, FOR AN AUGMENTED PRESENTATION

PRIORITY

This application claims the benefit of German Patent Application No. 102018105917.5, filed on Mar. 14, 2018, and which is hereby incorporated herein by reference in its entirety.

FIELD

The present invention relates to a method for user-specific calibration of a display apparatus placeable on the head of a user for an augmented presentation.

BACKGROUND

In the case of display apparatuses for augmented presentation, it is important that the exact position of the display apparatus on the head of the user and thus the position of the virtual image plane relative to the eyes of the user is known, so that the exact overlay desired for the augmented presentation of the virtually presented image with the real environment can be achieved.

SUMMARY

Proceeding from this, a method for user-specific calibration of a display apparatus that is placeable on the head of a user for an augmented presentation with which an accurate and individual calibration is able to be carried out easily is therefore intended to be provided.

Since in the method according to certain embodiments of the invention the basic calibration procedure is carried out, which generally only needs to be carried out by a user when the display apparatus is used for the first time, a good calibration can be achieved with this procedure since the position of the eye in all three spatial directions relative to the display apparatus is taken into account.

In an advantageous development, the fine calibration procedure can be carried out quickly and well. The adjustment data already obtained from the basic calibration procedure can be used in the fine calibration procedure, as a result of which the virtual marker is already perceivable by the user very close to the specified location of the real object. This leads to the desired quick and good calibrability.

In the method according to certain embodiments of the invention, positioning instructions that the user has input via an input interface of the display apparatus in order to bring the virtual marker itself into an overlay with the specified location of the real object that is as exact as possible can be evaluated to ascertain the positioning information. The input interface can be designed, for example, as a touch-sensitive surface of the display apparatus, for example on the holding apparatus, as a computer mouse, as a separate touch pad, as a separate keyboard, as voice control, as gesture control, etc.

It is also possible that recordings of the camera are evaluated to ascertain the positioning information. This can be used in particular if the user produces the overlay that is as exact as possible with the virtual marker by moving the real object. This can be used particularly well if the input interface is designed, for example, as voice control so that the user can move both hands freely.

Furthermore, it is possible to bring the virtual marker into overlap with the real target object, for example by head movements or other interactions with the input interface.

In the method according to certain embodiments of the invention, in step B2) of the fine calibration procedure, the positioning information for at least two different specified locations of the real object can be taken into account when deriving the correction data. This enables a higher calibration accuracy to be achieved.

Furthermore, it is possible in the method according to the invention to evaluate in the basic calibration procedure at least one recording of the user with the display apparatus being worn to ascertain the position of the at least one eye relative to the display apparatus. In particular, the at least one recording can be taken by means of the camera. For this purpose, a recording of the user is preferably performed via a mirror.

In the method according to certain embodiments of the invention, the position, ascertained in the basic calibration procedure, of the at least one eye relative to the display apparatus and/or the positioning information according to step B2) of the fine calibration procedure can be used to reduce a viewing-angle-dependent aberration by an opposite pre-distortion during image generation.

Furthermore, it is possible to use the position, ascertained in the basic calibration procedure, of the at least one eye relative to the display apparatus and/or the positioning information according to step B2) of the fine calibration procedure in order to reduce a parallax error that occurs during image generation on the basis of the different positions of the eye and camera.

For the augmented presentation, the recordings of the camera are evaluated (preferably continuously), so that a desired overlay of the generated virtual image with the real environment is achieved for the user.

The fine calibration procedure can be carried out independently of whether a basic calibration procedure or a previous fine calibration procedure has already been carried out. Such a fine calibration procedure can be further developed as has already been described.

If the position of the eye is mentioned here, this preferably refers to the center of the eye, which remains unchanged relative to the head even when the viewing direction changes. To calculate the center of the eye, the center of the pupil (in 3D), the viewing direction can be ascertained from the recordings, and the center of the eye can then be calculated based on specific assumptions (e.g. eye diameter of 24 mm).

Typically, the design can be based on a standard pupillary distance of 65 mm and a symmetrical distance between the eyes and the nose. For a large part of the population, this produces a relatively good result between the position at which the virtual object is to be presented in real space and the position at which the user actually sees it. The greater the actual deviation of the pupillary distance of the respective user from the assumed standard pupillary distance, the more the presentation of the virtual object deviates from the desired location. The same applies if there is a shift in the vertical direction due to different wearing positions of the display apparatus on the user's nose.

It is understood that the features specified above and the features yet to be explained below can be used not only in the specified combinations, but also in other combinations or on their own, without departing from the scope of the present invention.

BRIEF DESCRIPTION OF THE DRAWINGS

FIG. 4 shows a detailed flowchart of the basic calibration procedure of FIG. 3, and FIG. 5 shows a detailed flowchart of the fine calibration procedure of FIG. 3.

Figure 1:
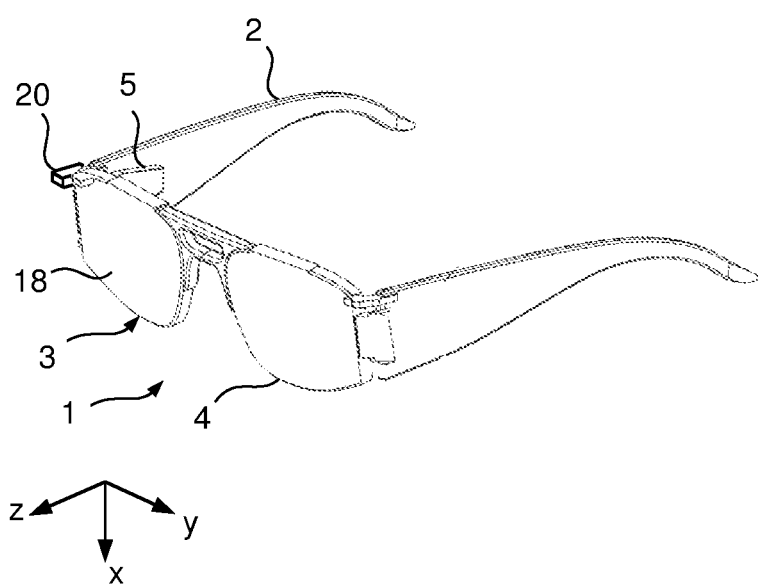
FIG. 1 shows a schematic perspective illustration of an exemplary embodiment of the display apparatus according to the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

The invention will be explained in more detail below on the basis of exemplary embodiments, with reference being made to the appended drawings, which likewise disclose features essential to the invention. These exemplary embodiments are only illustrative and should not be construed as restrictive. By way of example, a description of an exemplary embodiment with a multiplicity of elements or components should not be construed as meaning that all of these elements or components are necessary for implementation. Rather, other exemplary embodiments can also contain alternative elements and components, fewer elements or components, or additional elements or components. Elements or components of different exemplary embodiments can be combined with one another, unless stated otherwise. Modifications or variations that are described for one of the exemplary embodiments can also be applicable to other exemplary embodiments. To avoid repetitions, the same or corresponding elements in different figures are denoted by the same reference signs and are not explained multiple times.

An exemplary embodiment (or an embodiment) of the method according to the invention for user-specific calibration of a display apparatus 1 which is able to be placed on the head of a user for an augmented presentation is described below. For this purpose, an embodiment of the display apparatus 1 will first be described with reference to FIGS. 1 and 2.

Figure 2:
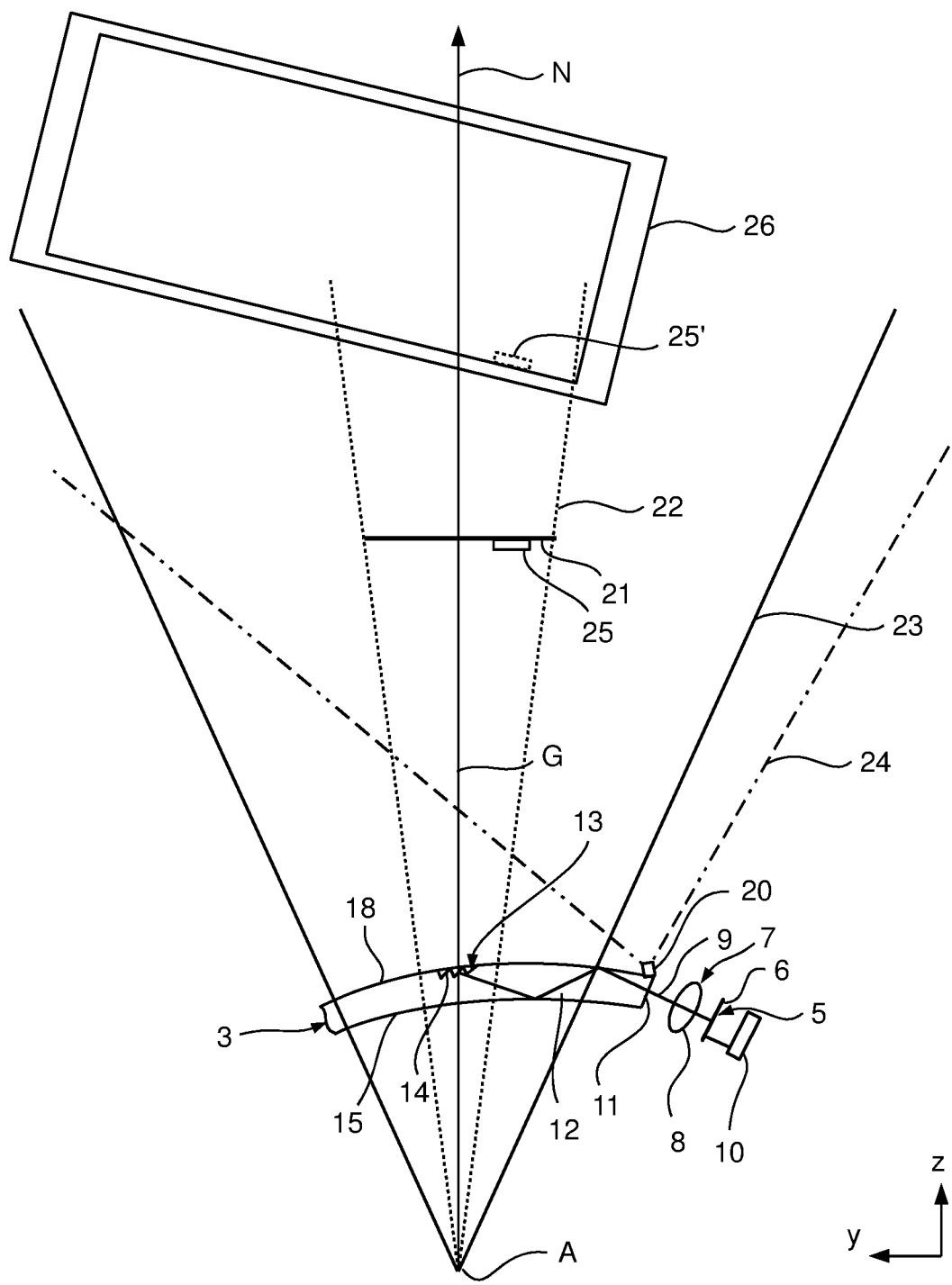
FIG. 2 shows an enlarged detailed side view of FIG. 1 plus an augmented presentation.

The embodiment of the display apparatus 1 shown in FIGS. 1 and 2 comprises a holding apparatus 2 which is able to be placed on the head of a user and can be designed, for example, in the manner of a spectacle frame, and a first and a second spectacle lens 3, 4 attached to the holding apparatus 2. The holding apparatus 2 with the spectacle lenses 3, 4 may take the form, for example, of sports goggles, sunglasses and/or spectacles for correcting defective vision, wherein a virtual image (also referred to as a virtual object below) can be introduced into the user's field of view via the first spectacle lens 3, as described below. The virtual image can be coupled into the field of view of the user by way of reflection, diffraction and/or transmission. The user can then perceive the virtual image in overlay with the environment, with the result that the desired augmented presentation can be realized.

For presenting the virtual image, the display apparatus 1 comprises an image generating module 5, which may be arranged in the region of the right-hand spectacle earpiece of the holding apparatus 2, as is schematically represented in FIG. 1. The image generating module 5 can be a two-dimensional image generating module 6 (FIG. 2), such as an OLED, an LCD or an LCoS chip or a tilting mirror matrix, with a multiplicity of pixels arranged in rows and columns, for example, or a module that comprises one or more (quickly) scanned light beams.

As can best be seen from the enlarged, schematic partial sectional view in FIG. 2, the display apparatus 1 comprises an imaging optical unit 7 which includes an optics element 8 arranged between the image generating element 6 or the image generator 6 and the first spectacle lens 3. Furthermore, the first spectacle lens 3 itself also serves as part of the imaging optical unit 7.

A light beam 9 may emanate from each pixel of the image generator 6. The desired image can be generated by appropriate activation of the pixels of the image generator 6 by means of a control unit 10, which may be part of the image generating module 5. In FIG. 2, the beam path of a light ray is plotted as representative of the light beam 9, and therefore reference is also made hereinafter to light ray 9.

The light ray 9 emanating from the image generator 6 passes through the optical element 8 and enters the first spectacle lens 3 via an input coupling portion 11 and is guided in therein along a light-guiding channel 12 to an output coupling portion 13. The output coupling portion 13 comprises at least one reflective deflection surface 14, on which a reflection of the light rays 9 takes place in the direction of a rear side 15 of the first spectacle lens 3, with the result that the light rays 9 exit the first spectacle lens 3 via the rear side 15.

Consequently, a user wearing the display apparatus 1 according to the invention on their head as intended can perceive the image generated by means of the image generator 6 as a virtual image when they look through the output coupling portion 13. In the embodiment described here, each reflective deflection surface 14 is designed as a partially reflective deflection surface 14, meaning that light from the environment is also transmitted through the reflective deflection surfaces 14. The user can thus perceive the virtual image or the virtual object in overlay with the environment.

As shown in the schematic illustration in FIG. 2, both the rear side 15 and the front side 18 of the first spectacle lens 3 are embodied to be curved. However, it is also possible for the rear side 15 and/or the front side 18 to be embodied to be planar.

The light beams 9 can be guided in the light-guiding channel 12 for example by total internal reflection at the front side 18 and the rear side 15. It is also possible for the front side 18 and/or the rear side 15 to comprise a reflective or partially reflective coating in the region of the light-guiding channel in order to effect the desired light guidance. Furthermore, it is possible that a reflective or partially reflective layer that replaces the front side 18 or the rear side 15 in the region of the light-guiding channel 12 as a reflective surface is formed in the first spectacle lens. Two reflective layers or partially reflective layers which then form the light-guiding channel 12 can also be formed in the spectacle lens 3.

The display apparatus 1 further comprises a camera 20, shown schematically in FIGS. 1 and 2, which records the environment in front of the spectacle lens and feeds it to the control unit 10. The display apparatus 1 can also comprise a plurality of cameras 20 and is designed here in such a way that the virtual image is perceivable by the user at a comfortable observation distance of, for example, 1.5 m in a virtual imaging plane 21 of the display apparatus 1. FIG. 2 shows the virtual imaging plane 21 together with the field of view 22 (with, for example, 20°×30°), which is operated by the display apparatus 1, schematically and not to scale. Furthermore, the natural field of view 23 (with e.g. 120°× 90°) of the corresponding eye A of the user and the image field 24 (with e.g. 45°×55°) that the camera 20 can record are shown.

In the example shown in FIG. 2, a hinge 25 is shown to the user as a virtual image, for example during the assembly of a cabinet. The position of the presentation of the virtual image is chosen such that the user sees the virtually presented hinge at the position of a cabinet door 26 on which the hinge should be mounted. This overlaid view of the virtual hinge with the cabinet door 26 is identified in FIG. 2 by the reference symbol 25'. In order for this overlaid presentation to be possible in a positionally precise manner, the recording of the cabinet door 26 by the camera 20 is evaluated and based thereon the position of the hinge 25 to be presented virtually is then ascertained, and a corresponding presentation is implemented. If the display apparatus 1 according to the invention comprises only a single camera 20 and no other supporting sensors for the three-dimensional capturing of objects, the real object (here the cabinet door 26), including its dimensions, must be known and detected via image processing algorithms.

Another important point for a good overlaid presentation is the knowledge of the position of the eye A relative to the display apparatus 1 and thus relative to the virtual imaging plane 21. The more precisely this is known, the better and more accurately the overlaid presentation can be realized.

The position of the eye A relative to the display apparatus 1 and in particular relative to the virtual imaging plane 21 varies on the one hand from user to user. On the other hand, it also depends in the case of a user on the exact positioning of the holding apparatus 2 on the head of the user, which can additionally exhibit certain variations from one placement to the next.

The user-specific calibration of the display apparatus 1 can be carried out as follows.

Figure 3:
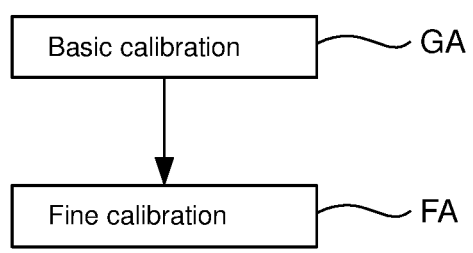
FIG. 3 shows a flowchart for describing the calibration method according to the invention in accordance with an exemplary embodiment.

In a basic calibration procedure GA (FIG. 3), when the holding apparatus 2 is in the state in which it is placed on the head of the user, the position of the eye A in all three spatial directions (i.e. the x-, y- and z-directions) relative to the display apparatus 1 is ascertained. This ascertainment of the position can be carried out, for example, in such a way that the user who wears the display apparatus 1 on their head takes one or more photos (from an effective distance of 1.5 m, for example) and from different directions. The photo or photos can here be recorded by means of the camera 20 via a mirror or with a separate camera (for example a smartphone camera). It is also possible that the user who is wearing the display apparatus 1 on their head is additionally asked to, for example, look at the camera or fixate their gaze on a distant point.

These dimensions can be ascertained, for example, as described in European patent applications no. 17153559.4 and no. 17153556.0. This has the advantage that (in the preferred embodiment) the firmware of the display apparatus 1 already knows the 3-dimensional sizes of the display apparatus 1 (for example by way of CAD data) and, in particular, the position of the camera relative to the spectacle lenses and that they do not need to be ascertained first from the recordings.

The photo or photos are transmitted to the control unit 10 which, based on the photo or photos and on the knowledge of the dimensions of the display apparatus 1, calculates the necessary adjustment data (such as, for example, pupillary distance, vertex distance, forward inclination, visual points, etc.).

The adjustment data are then stored in the display apparatus 1 (for example in the control unit 10 itself), wherein the image generating module 5 generates the desired images taking into account the adjustment data. The adjustment data can, for example, be stored in the calculated form (that is to say for example as a pupillary distance, vertex distance, forward inclination, visual points, etc.). In this case, a corresponding conversion must then be carried out during image generation. However, it is also possible to immediately store the adjustment data in a converted form for the display apparatus 1 and the image generating module 5, so that no further conversion of the adjustment data is required during the image generation and said data can be used immediately.

In the simplest implementation, these are two offset values per eye, in which the virtual object can be displayed in the same size and shape as in the standard presentation (that is, in the presentation in which a "standard" or "preset" position of the eyes (symmetrical eyes, pupillary distance 65 mm, etc.) is assumed), but must be displayed offset by Delta_x and Delta_y in the two dimensions of the virtual image plane. In the case of a greater deviation of the eye position from the "standard value" and/or in the case of spectacle wearers who, for example, wear their corrective spectacles in addition to/under the smartglasses, a complicated conversion may be necessary due to the occurrence of aberration, in which, for example, the individual image points of the original virtual image (i.e. the one for the "standard user") experience different offsets.

Of course, the calculation of the adjustment data does not have to be carried out in the control unit 10. It is also possible for this calculation to be carried out in a separate computing unit with a separate computing module. For example, this may be a remote server.

When recording the photo or photos, it should be noted that the photos are generally taken at an oblique angle. This must be taken into account when calculating the adjustment data. Since the dimensions of the display apparatus 1 are known, the angle at which the recording was made can be determined from the photo or photos.

If the recording is made by means of the camera 20, the position of the camera 20 relative to the holding apparatus 2 and thus the perspective during the recording must be taken into account when calculating the adjustment data.

By means of this basic calibration procedure, an individual adaptation of the display apparatus 1 which is placeable on the head of the user is carried out. This basic calibration procedure can also be referred to as the centration procedure. The basic calibration or centration procedure can be carried out, for example, before the display apparatus is used for the first time (e.g. directly when purchasing).

A possible basic calibration procedure is described step by step in detail below with reference to FIG. 4.

In step S1, the display apparatus 1 is placed on the head of the user. As a rule, the user will put on the display apparatus 1 themselves.

In optional step S2, the display apparatus 1 can be informed, for example via its input interface, as to which user is currently wearing the display apparatus 1 on their head. For this purpose, the display apparatus 1 can have a corresponding internal memory in which the calibration data for different users are stored individually.

In step S3, the user starts the calibration procedure.

In step S4, the display apparatus 1 requests that the user stand in front of a mirror, wherein the distance from the mirror is smaller, for example, than the arm length of the user. This request can be communicated to the user, for example optically and/or acoustically, by means of the display apparatus 1.

In step S5, the user fixates on a defined point of the display apparatus 1. This can be communicated to the user again by means of the display apparatus 1. For example, the defined point can be the camera 20, which means that the user views the camera 20.

In step S6, the user initiates a recording.

If a plurality of recordings are desired or possibly required by the display apparatus 1, the user is requested to do so in step S7. This request can include, for example, that the user should change their head position relative to the mirror (for example, rotate it). Step S7 again leads to step S5, so that steps S5 and S6 are worked through again.

As soon as sufficient recordings have been made, the user is informed in step S8 by the display apparatus that the calibration recording or calibration recordings have been completed.

The calibration data are then ascertained in step S9.

For this purpose, in step $S9_1$, an image analysis with detection of the display apparatus 1 and the eyes of the user can be effected in all the recordings made.

In step $S9_2$, the position of the display apparatus relative to the mirror and the viewing direction (pupil—fixation point) are then calculated for each recording.

The eye centers of both eyes are then ascertained in step $S9_3$.

In step $S9_4$, it is ascertained whether there exists a successful evaluation.

If this is not the case, the user is requested in step S10 to repeat the calibration recordings, wherein step S10 returns to step S4.

When the evaluation is classified as successful, the procedure proceeds to step S11, in which the calibration data are adopted. If a user was input in step S2, they are stored individually for this user.

Since a user does not usually place the display apparatus 1, when it is worn again, exactly in the same way (for example, with respect to the location on the nose and thus the relative position in the vertical direction) as when carrying out the basic calibration procedure, the invention also offers a fine calibration procedure FA (FIG. 3), which can also be referred to as augmented calibration.

In the worn state of the display apparatus 1, the user is asked to view a real object, which is called a reference object, in the fine calibration procedure. This can be, for example, a printout on a sheet of paper with a known pattern, a cube, the case of the display apparatus 1 or another real object known to the system of the display apparatus 1. In this case, a mirror is no longer necessary. If the user now views the object, a virtual marker is generated in the virtual imaging plane 21 by means of the image generating module 5 in such a way that the virtual marker overlaps if possible with a specified location of the real object. This can be, for example, a corner of the cube or, for example, a unique location on a pattern printed on a sheet of paper that lies on a table. The virtual marker is positioned here taking into account the adjustment data stored in the display apparatus 1. That is to say the marker is first displayed at a location in the virtual image as if the display apparatus 1 had been placed in exactly the same way as in the basic calibration. The virtual marker can be a reticle, for example.

If there is an exact overlay of the marker with the predetermined location, the user confirms this by way of a corresponding input via the input interface. If there is no exact overlay for the user, they can input positioning instructions via the input interface that shift the marker for the user in such a way that it then appears in exact overlay with the specified location of the real object. If this is the case, the user confirms this via the input interface.

Based on the positioning instructions input, the control unit 10 can then correspondingly correct the adjustment data and thereby generate new adjustment data, which are again stored in the control unit 10. The new adjustment data are then used as adjustment data in the image generation by means of the image generating module 5, with the result that an optimally augmented presentation is possible.

The user can always carry out a fine calibration procedure if the augmented presentation is too imprecise for them. They can therefore carry out a very quick optimal calibration in a simple manner.

In the fine calibration procedure, for example, the axis or the axes along which the position of the display apparatus 1 typically changes more can be set more sensitively than the other axis or the other axes. For example, a display apparatus 1 with a spectacle-like holding apparatus 2 usually slips more in the vertical direction than in the horizontal direction. The adjustability in the vertical direction is thus set more sensitively than in the horizontal direction.

Since the position of the virtual marker is realized based on the available adjustment data in the fine calibration procedure, the virtual marker will generally be visible to the user relatively close to the specified location, even if the user places the display apparatus 1 somewhat differently than during the basic calibration. This means that a quick and good fine calibration is possible.

In the fine calibration procedure, several specified locations can also be worked through one after the other. The virtual marker must be positioned accordingly for each of the specified locations. The correction directions can be averaged, and this average can be adopted as a fine calibration. This leads to a very good adjustment result.

Alternatively, the fine calibration procedure can also be carried out in such a way that the user positions the real object in space in such a way that the specified location of the real object coincides with the virtual marker presented. It is thus not the virtual marker that is moved, but the real object. Since the real object is recorded by the camera 20, it is possible to calculate therefrom how the adjustment data should be corrected. This is attractive, for example, in the case of a user interface (or an input interface) with voice control.

A possible fine calibration procedure FA is described in detail step by step below with reference to FIG. 5.

In step S12, the user puts on the display apparatus 1.

In step S13, the user starts the fine calibration routine. This can be done, for example, by way of a special voice instruction or another input via the input interface.

In optional step S14, the display apparatus 1 can be informed (e.g. via the input interface) which user is currently wearing the display apparatus on their head.

In step S15, the control unit 10 calls up the adjustment data stored in it. If a basic calibration procedure and/or a fine calibration procedure has already been carried out, correspondingly ascertained adjustment data are available (possibly for the individual user, if this has been taken into account). Otherwise, the adjustment data have prescribed values. Initial values are thus available for the subsequent step.

In step S16, the display apparatus searches for the reference object via the live images from the camera 20 and displays the virtual marker. The adjustment data currently available (the initial values) are taken into account when presenting the marker.

In step S17, the user can confirm that the marker is displayed at the correct location. If this is not the case, the user will first produce the desired overlap of the marker with the corresponding location of the reference object in step S17. For this purpose, the user can move the reference object and/or can move the marker via corresponding inputs via the input interface.

As soon as the desired overlap is present, corrected adjustment data are calculated or generated in step S18 and stored in the control unit 10.

If the desired accuracy in the overlay is not present, the procedure can jump back to step S16, and steps S16 to S18 are then repeated, but with the corrected adjustment data already being used in the presentation of the marker.

If there is sufficient accuracy, step S18 is followed by step S19, in which the last corrected adjustment data are stored in the control unit 10. This can optionally be the case for an individual user, if this is provided.

Step S15 can also be implemented in such a way that it is first checked whether a basic calibration has already been carried out. If this is not the case, the basic calibration is continued from step S2. After step S11 of the basic calibration procedure, step S16 is then carried out.

Of course, the fine calibration procedure can also be carried out independently of the basic calibration procedure. As already mentioned, prescribed values for the adjustment data can be taken as the basis in step S15 of the fine calibration procedure.

It is furthermore possible to correct or minimize aberrations. In display apparatuses that are placeable on the head of a user, it is known to pre-correct chromatic aberrations or distortions of the imaging optical unit by means of corresponding pre-distorted image generation. If the virtual image is not superimposed as in FIG. 2 and therefore not in the zero direction N but rather at an oblique angle, for example laterally at the bottom, the user's eye looks in the superimposition direction in order to see the generated image. For a user who does not need spectacles themselves, the image is in principle displayed at least without major aberration or without any aberration.

However, this is not the case for a spectacle wearer having, for example, single vision lenses, since the individual glass is optimized for the zero direction N. When viewed obliquely, the object being viewed is distorted. If the position of the eye relative to the display apparatus 1 is known, the angle at which the eye looks through the spectacle lens 3 is also known.

If the display apparatus 1 is a display apparatus 1 with an insert for single vision lenses, the position of the single vision lens relative to the display apparatus is unique and known. Taking into account the diopter strength of the single vision lens and the material of the single vision lens, the lens thickness (for a first-order aberration calculation) in the viewing direction can be calculated. For a better calculation, the lens shape on the viewing surface (i.e. two two-dimensional partial surfaces of both glass surfaces) can be used. These data can be provided, for example, by the supplier of the single vision lens or can be calculated in the display apparatus with certain assumptions (for example typical lens shapes for single vision lenses).

In the case of display apparatuses in which the user can wear their own spectacles under the display apparatus, a most likely position must be assumed for the position, which lies between the spectacle lens 3 of the display apparatus 1 and the user's eye. In the simplest case, the user only specifies the diopter strength with or without specifying the lens material of their spectacles. Here, the most likely assumptions are made for missing required parameters. This means that a very optimal correction cannot be calculated. However, it is possible to calculate the aberrations that occur in principle and then to reduce them at least in the presentation.

In the case of display apparatuses 1 that make it possible to wear one's own spectacles with prescription lenses under the display apparatus 1, it is possible during the basic calibration procedure not only to make the image processing algorithm detect the display apparatus 1 and the eyes, but also the unknown spectacle frame. Methods for ascertaining frame rims from photos are known to a person skilled in the art. For example, reference is made to European patent application no. 17153651.9.

In the case of the hitherto described embodiment of the display apparatus 1 according to the invention, the virtual image is introduced into the user's field of view via the right spectacle lens 3. It is of course also possible for it to be introduced via the left spectacle lens 4. This can be carried out alternatively or in addition to the introduction via the right spectacle lens 3. The user-specific calibration is carried out for the spectacle lens(es) 3 and 4 used. If the introduction is carried out via both spectacle lenses 3, 4, a three-dimensional image impression can be provided.

The spectacle lenses 3, 4 may have a refractive power of zero or a refractive power other than zero (in particular for correcting defective vision).

The holding apparatus 2 need not take the form of a spectacle-like holding apparatus. Any other kind of holding apparatus by which the display apparatus 1 can be placed or worn on the user's head is also possible.

The present invention has been described in detail on the basis of exemplary embodiments for explanatory purposes. However, it is clear to a person skilled in the art that features of the described exemplary embodiments can be combined with features of other exemplary embodiments within the scope of the invention and that it is possible to deviate from the exemplary embodiments within the scope of the invention.

The invention claimed is:

1. A method for user-specific calibration of a display apparatus placeable on the head of a user for an augmented presentation, wherein the display apparatus comprises a holding apparatus which is placeable on the head of a user, wherein a camera is attached to the holding apparatus, wherein an image generating module is attached to the holding apparatus and generates an image, and wherein an imaging optical unit is attached to the holding apparatus and depicts the generated image when the holding apparatus is in the state in which it is placed on the head of the user in such a way that the user can perceive it with at least one eye as a virtual image in overlay with the real environment, the method comprising:
   A) in a basic calibration procedure in the state of the holding apparatus in which it is placed on the head of the user, ascertaining a position of the at least one eye in all three spatial directions relative to the display apparatus, and storing the position in the display apparatus as adjustment data, the image generating module generating the image taking into account the adjustment data; and B) in a fine calibration procedure in the state of the holding apparatus in which it is placed on the head of the user:
  B1) showing a virtual marker to the user as a virtual image such that the virtual marker is presented as close as possible to a specified location of a real object based on the adjustment data stored in the display apparatus, and
  B2) deriving correction data based upon positioning information which specifies a relative movement of the virtual marker and the real object in order to attain for the user an overlay of the virtual marker with the specified location of the real object that is as exact as possible, and
  B3) after carrying out steps B1) and B2), correcting the adjustment data with the correction data obtained in this way and stored in the display apparatus as new adjustment data.

2. The method as claimed in claim 1, wherein, in step B2) of the fine calibration procedure, the positioning information for at least two different specified locations of the real object are taken into account when deriving the correction data.

3. The method as claimed in claim 2, in which the position, ascertained in the basic calibration procedure, of one or both of the at least one eye relative to the display apparatus and the positioning information according to step B2) of the fine calibration procedure is used to reduce a viewing-angle-dependent aberration by an opposite pre-distortion during image generation.

4. The method as claimed in claim 3, in which the position, ascertained in the basic calibration procedure, of one or both of the at least one eye relative to the display apparatus and the positioning information according to step B2) of the fine calibration procedure is used in order to reduce a parallax error that occurs during image generation on the basis of the different positions of the eye and camera.

5. The method as claimed in claim 2, in which the position, ascertained in the basic calibration procedure, of one or both of the at least one eye relative to the display apparatus and the positioning information according to step B2) of the fine calibration procedure is used in order to reduce a parallax error that occurs during image generation on the basis of the different positions of the eye and camera.

6. The method as claimed in claim 1, in which the position, ascertained in the basic calibration procedure, of one or both of the at least one eye relative to the display apparatus and the positioning information according to step B2) of the fine calibration procedure is used to reduce a viewing-angle-dependent aberration by an opposite pre-distortion during image generation.

7. The method as claimed in claim 6, in which the position, ascertained in the basic calibration procedure, of one or both of the at least one eye relative to the display apparatus and the positioning information according to step B2) of the fine calibration procedure is used in order to reduce a parallax error that occurs during image generation on the basis of the different positions of the eye and camera.

8. The method as claimed in claim 1, in which the position, ascertained in the basic calibration procedure, of one or both of the at least one eye relative to the display apparatus and the positioning information according to step B2) of the fine calibration procedure is used in order to reduce a parallax error that occurs during image generation on the basis of the different positions of the eye and camera.

9. The method as claimed in claim 1, in which the position, ascertained in the basic calibration procedure, of the at least one eye relative to the display apparatus is used to reduce a viewing-angle-dependent aberration by an opposite pre-distortion during the image generation.

10. The method as claimed in claim 1, in which positioning instructions that the user has input via an input interface in order to bring the virtual marker itself into an overlay with the specified location of the real object that is as exact as possible are evaluated to ascertain the positioning information.

11. The method as claimed in claim 1, in which recordings of the camera are evaluated in order to ascertain the positioning information.

12. The method as claimed in claim 1, wherein in step A) at least one recording of the user with a worn display apparatus is evaluated to ascertain the position of the at least one eye.

13. The method as claimed in claim 12, wherein the at least one recording is taken by means of the camera.

14. The method as claimed in claim 1, in which the position, ascertained in the basic calibration procedure, of the at least one eye relative to the display apparatus is used to reduce a viewing-angle-dependent aberration by an opposite pre-distortion during the image generation.

15. The method as claimed in claim 1, in which positioning instructions that the user has input via an input interface in order to bring the virtual marker itself into an overlay with the specified location of the real object that is as exact as possible are evaluated to ascertain the positioning information.

16. The method as claimed in claim 1, wherein recordings of the camera are evaluated in order to ascertain the positioning information.

17. The method as claimed in claim 1, wherein in step A) at least one recording of the user with a worn display apparatus is evaluated to ascertain the position of the at least one eye.

18. The method as claimed in claim 17, wherein the at least one recording is taken by means of the camera.

19. A method for the user-specific calibration of a display apparatus placeable on the head of a user for an augmented presentation, wherein the display apparatus comprises a holding apparatus which is placeable on the head of a user, a camera attached to the holding apparatus, an image generating module that is attached to the holding apparatus and generates an image, and an imaging optical unit that is attached to the holding apparatus and depicts the generated image when the holding apparatus is placed on the head of the user in such a way that the user can perceive it with at least one eye as a virtual image in overlay with the real environment, the method comprising:

A) in a fine calibration procedure in the state of the holding apparatus in which it is placed on the head of the user:
  A1) showing a virtual marker to the user as a virtual image such that the virtual marker is presented as close as possible to a specified location of a real object based on adjustment data stored in the display apparatus,
  A2) deriving correction data based upon positioning information which specifies a relative movement of the virtual marker and the real object in order to attain for the user an overlay of the virtual marker with the specified location of the real object that is as exact as possible, and A3) after carrying out steps A1) and A2), correcting the adjustment data with the correction data obtained in this way and are stored in the display apparatus as new adjustment data.

* * * * *